Oct. 5, 1937.　　　J. F. WALLACE　　　2,095,112

SHOCK ABSORBER

Original Filed Nov. 2, 1933

INVENTOR.
JOHN F. WALLACE
BY
Kwis Hudson & Kent
ATTORNEYS

Patented Oct. 5, 1937

2,095,112

UNITED STATES PATENT OFFICE 2,095,112

SHOCK ABSORBER

John F. Wallace, Cleveland, Ohio, assignor to The Cleveland Pneumatic Tool Company, Cleveland, Ohio, a corporation of Ohio Original application November 2, 1933, Serial No. 696,408. Divided and this application May 4, 1935, Serial No. 19,852

6 Claims. (Cl. 267—64)

This invention relates to improvements in shock absorbers. It is designed primarily for use upon airplanes to cushion the impact of landing and to absorb the shocks of taxying.

The present application is a division of my co-pending application, Serial No. 696,408, filed November 2, 1933.

One of the objects of the invention is the provision of novel means for regulating the flow of liquid through metering openings in such manner as to automatically adjust the rate of flow to the load at any given instant, thereby making the operation of the device sufficiently flexible to fit all conditions.

Another object is the provision of novel valve means for varying the rate of flow of liquid through a piston or other partition employed in shock absorbers having hydraulic action.

Still another object is the provision of a shock absorber having hydraulic action with automatic flow rate adjustment, the latter being carried exclusively by the piston of the strut.

Figure 1:
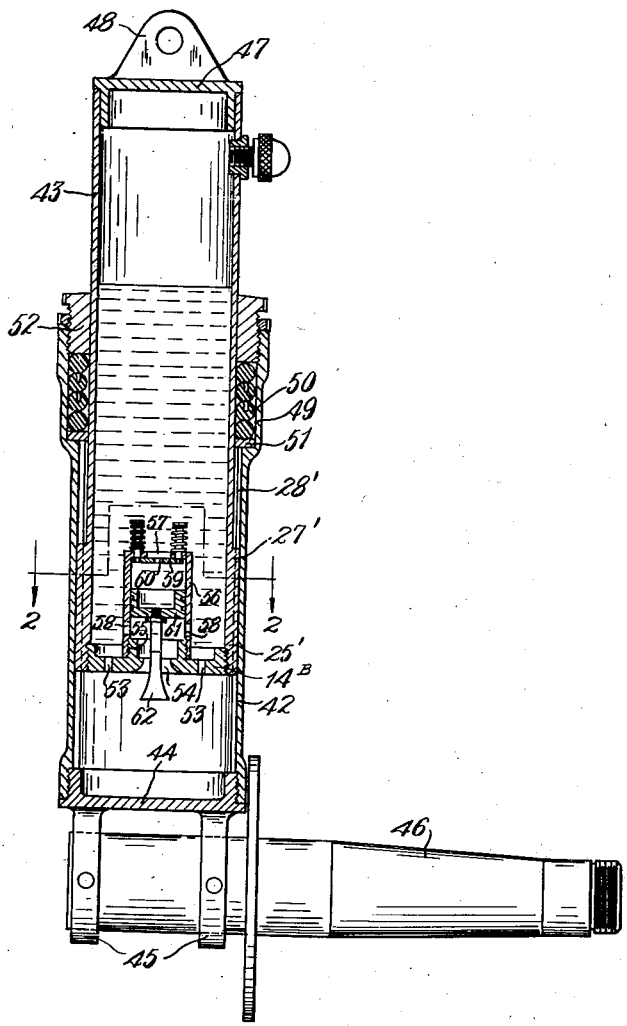

Other objects and features of novelty will appear as I proceed with the description of those embodiments of the invention which, for the purposes of the present application, I have illustrated in the accompanying drawing, in which Fig. 1 is an elevational view, partly in central longitudinal section, of an airplane strut embodying the invention.

Figure 2:
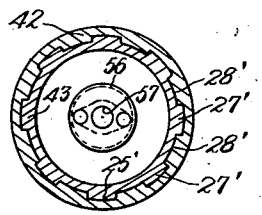
Figure 3:
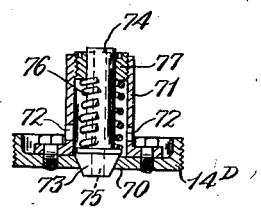
Figure 4:
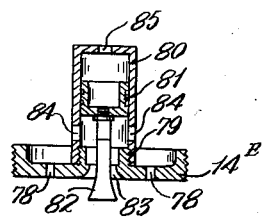

Fig. 2 is a cross sectional view of the same taken substantially on the line 2—2 of Fig. 1, and Figs. 3 and 4 are sectional detailed views of modified forms of self-adjusting liquid metering valves.

In Fig. 1 I have shown my invention applied to an airplane strut in which the usual arrangement of the cylinders is inverted the outer cylinder in this case being the lower cylinder and the inner cylinder being the upper cylinder. This is a desirable arrangement where the length of the strut must be restricted on account of the design of the airplane upon which the strut is to be used. While the present invention is peculiarly suited to a strut of this character, it is to be understood that its application is not limited in this respect.

The construction includes an outer lower cylinder 42 and an inner upper cylinder 43. The outer end of the lower cylinder is closed by a cap 44 which is threaded into the end of that cylinder and carries a pair of ring brackets 45 to which is fastened a wheel spindle 46. The inner cylinder 43 has a cap 47 at its outer end, which may be welded to the cylinder, and carries a bracket 48 for attachment to the airplane.

The outer cylinder is formed with an enlargement at its inner end, in which there is a pocket 49. Within the latter I mount a packing 50 of a character such that it will expand laterally when subjected to pressure axially of the strut. For a more particular description of this packing, reference may be had to my Patent No. 1,888,578, issued November 22, 1932. At the inner end this packing is engaged by a metal ring 51, which is free to move in pocket 49, while at its outer end the packing is engaged by a gland ring 52 threaded into the end of the cylinder.

The packing 50 bears against the smooth outer surface of the cylinder 43. At the lower end of the latter cylinder however there is a head 25', in the outer surface of which are cut splines 27' which are interfitted with splines 28' formed on the inner surface of cylinder 42 and extending from the pocket 49 to the cap 44. These interengaging splines prevent swiveling.

In the head 25' I mount, preferably by a threaded connection, a piston 14B. The piston is provided with continuously open holes 53 of small size and a central opening 54 of larger size. Around this central opening there is an upwardly extending annular flange 55 upon which is threaded a small cylinder 56 which is closed at its upper end except for a central port 57, and is provided with a plurality of ports 58 in its side walls directly above the flange 55. The port 57 is normally closed by a spring controlled valve plate 59, in which there is a small central opening 60.

Within the cylinder 56 there is a piston 61 which is closely fitted to the cylinder and carries centrally a depending tapered metering pin 62. When the strut is at rest, the piston 61 is in its lowermost position, closing off ports 58. When a small shock is encountered, liquid flows through the holes 53, and the piston 61 may rise slightly to permit some flow through opening 54 and the partially open ports 58. On the rebound, liquid enters the space within the cylinder 56 through port 57, the plate 59 being unseated. The piston 61 is thereby forced down to its lowermost position, and the metering of liquid must take place exclusively through the holes 53, thereby checking the rebound.

When the strut receives a heavy impact, the liquid pressure beneath the piston 61 and against the lower end of pin 62 expels the liquid above the piston through the small hole 60, as rapidly as the small size of that hole will permit, thereby uncovering more or less of the ports 58 in order that flow through the piston may take place at a faster rate and in order that some of the impact may be absorbed by the highly resilient air in the upper end of the strut. When the impact is particularly heavy the piston 61 may rise high enough in the cylinder 56 to bring the larger lower end of pin 62 into the opening 54, thereby retarding the flow.

It will be appreciated that this valve may be employed with or without the metering pin. Its action is hydraulically controlled except as it is affected by the springs controlling plate 59.

Its operation may be varied by changes in the size of the hole 60 as well as by changes in the size or number of holes 53.

The valve units illustrated in Figs. 3 and 4 may be substituted for that of Fig. 1, if desired.

In Fig. 3 the plate 14D has no opening therethrough except the central conical opening 70. To the plate around this opening there is secured by any suitable means a sleeve or cylinder 71 having side ports 72. Within this sleeve there is a conical valve piece 73 on the lower end of a stem 74, the valve piece and stem being drilled axially to form a central continuously open passage 75. A coil spring 76 surrounds the stem 74 and presses at its lower end against the valve piece 73 and at its upper end against a collar 77 which is threaded into the sleeve and has a smooth bore by means of which the stem 74 is guided. The tension of the spring may be varied by adjustment of the collar 77.

On the compression stroke liquid flows through passage 75. If pressure conditions are such however that the rate of flow permitted by this small passage is insufficient, then the valve piece will rise, compressing spring 76, permitting flow around the valve piece into the cylinder 71 and out through the ports 72. It may be noted however that when the valve piece 73 is lifted off its seat the effective area exposed to the pressure beneath the piston is increased, and the closing of the valve by the spring 76 is correspondingly delayed. Variations in operation are accomplished by the adjustment of the collar 77.

The form of valve illustrated in Fig. 4 is quite similar to that of Fig. 1. The plate 14E is provided with small openings 78 like the openings 53 of Fig. 1. It also has an annular flange 79 on which is threaded a cylinder 80 in which slides a piston 81 supporting a metering pin 82 which extends through a central opening 83 in the plate 14E.

The cylinder has side ports 84 and an end port 85. The operation of this device is quite similar to that of Fig. 1. On the rebound, liquid can enter the space within the cylinder 80 above the piston 81 somewhat more slowly than through port 57 with the valve plate 59 unseated. On the impact stroke, the piston 81 rises at a rate of speed more or less in proportion to the force of the impact, except that the size of the stream flowing through the port 85 is affected by the speed of flow, in accordance with a well known law of hydraulics, that is to say, if the speed of flow is moderate, the quantity of liquid passing through the orifice at any given instant is greater than it is when the speed is considerably increased.

Variations from the described structures may be employed. Accordingly, I desire it to be understood that the scope of the invention is to be regarded as defined exclusively by the appended claims rather than by the foregoing description or the accompanying illustrations.

Having thus described my invention, I claim:

1. In a shock absorber, two telescoping members adapted to be interposed between the parts whose relative movements are to be cushioned, a partition fixed with respect to one of said members having a liquid metering passage extending centrally therethrough, an upwardly extending cylinder mounted on said partition surrounding said passage, and means for progressively changing the size of said passage as the pressure within the shock absorber increases or decreases, comprising a metering pin cooperating with said passage and extending upwardly into said cylinder, said pin being mounted in the cylinder, and means in the cylinder permitting movement of the pin in response to variations in fluid pressure within the shock absorber.

2. In a shock absorber, two telescoping members adapted to be interposed between the parts whose relative movements are to be cushioned, a partition fixed with respect to one of said members having a liquid metering passage therethrough, and means for progressively changing the size of said passage as the pressure within the shock absorber increases or decreases, said means being carried exclusively by said partition and being actuated in both directions exclusively by fluid pressure within the shock absorber.

3. In a shock absorber, two telescoping members adapted to be interposed between the parts whose relative movements are to be cushioned, a partition fixed with respect to one of said members having a liquid metering passage therethrough, a cylinder carried by said partition concentric with said passage, said cylinder having a port therethrough, and means movable lengthwise of said cylinder and responsive to pressures within the shock absorber for varying the effective size of said port.

4. In a shock absorber, two telescoping members adapted to be interposed between the parts whose relative movements are to be cushioned, a partition fixed with respect to one of said members having a liquid metering passage extending centrally therethrough, a cylinder carried by said partition concentric with said passage, and spaced from the surrounding walls of the shock absorber, the free end of the cylinder being provided with an opening, a piston slidable in said cylinder, and a metering pin carried by the piston and extending through said metering passage.

5. In a shock absorber, two telescoping members adapted to be interposed between the parts whose relative movements are to be cushioned, a partition fixed with respect to one of said members having a liquid metering passage therethrough, a cylinder carried by said partition concentric with said opening, the free end of the cylinder being provided with an opening, a piston slidable in said cylinder, and a metering pin carried by the piston and extending through said metering passage, said cylinder having a port in its side wall adapted to be closed or opened by said piston.

6. In a shock absorber, two telescoping members adapted to be interposed between the parts whose relative movements are to be cushioned, a partition fixed with respect to one of said members having a liquid metering passage therethrough, a cylinder carried by said partition concentric with said passage, a valve in the free end of the cylinder normally spring-closed and adapted to open by liquid pressure during the expanding stroke of the shock absorber, a piston slidable in said cylinder, and a metering pin carried by the piston and extending through said metering passage.

JOHN F. WALLACE.